(12) United States Patent
Nachtsheim et al.

(10) Patent No.: US 6,448,906 B1
(45) Date of Patent: Sep. 10, 2002

(54) WIRELESS DETECTION OF ELECTRONIC DEVICES

(75) Inventors: Stephen Nachtsheim, Atherton; James Kardach, Saratoga, both of CA (US); Jon Inouye, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/428,669

(22) Filed: Oct. 27, 1999

(51) Int. Cl.[7] .............................................. G08B 21/00
(52) U.S. Cl. ....................... 340/945; 244/1 R; 340/963; 455/67.3
(58) Field of Search ................................. 340/945, 963, 340/971, 539, 825.08, 825.69, 825.72, 505, 959; 455/227, 673, 1, 134, 404, 98; 701/14, 3, 9; 244/1 R

(56) References Cited

U.S. PATENT DOCUMENTS

| 5,543,779 | A | * | 8/1996 | Aspesi et al. ................ 340/539 |
| 5,815,407 | A | * | 9/1998 | Huffman et al. ............ 340/945 |
| 5,856,803 | A | * | 1/1999 | Pevler .......................... 342/13 |
| 5,970,395 | A | * | 10/1999 | Weiler et al. ............... 455/67.3 |
| 5,991,614 | A | * | 11/1999 | Oura ........................... 455/404 |
| 6,069,588 | A | * | 5/2000 | O'Neill, Jr. .................. 343/713 |

* cited by examiner

Primary Examiner—Brent A. Swarthout
(74) Attorney, Agent, or Firm—Fish & Richardson P.C.

(57) ABSTRACT

A device uses bluetooth techniques to communicate with electronic devices in an airplane. During take off or landing, the radio on board the airplane operates in bluetooth mode to send a global poll to all devices requesting that they respond. If a device responds, then it indicates that the device is on at an unauthorized time. This informs the crew that they should try to find the unauthorized device and turn it off.

10 Claims, 1 Drawing Sheet

WIRELESS DETECTION OF ELECTRONIC DEVICES

BACKGROUND

There has been a concern that certain portable devices, including personal computers, cellular telephones, and the like, may interfere with airline navigational equipment during takeoff or landing. The crew asks the passengers to shut down their devices prior to take-off or landing. Many people do not actually shut their device off. Also, some notebooks with poorly placed on/off switches can turn on unintentionally when bumped. These operating devices could cause interference with the airline's navigational equipment.

Bluetooth is a standard that allows wireless communication from an electronic device to some hub of the wireless device. The Bluetooth specification is an open specification for wireless communication of data and voice, e.g. between laptop computers and cellular telephones. The standard is described, inter alia, at www.bluetooth.com.

Bluetooth wireless radios operate in the 2.4 GHz ISM band using a frequency hop transceiver. The standard enables operation using a special network topology, that allows point-to-point connection and point-to-multipoint connections.

Other wireless data communication standards are also known. For example, wireless ethernet, and other wireless network protocols are used in electronic devices.

Many portable devices, including notebook computers and personal digital assistants, may eventually have a Bluetooth specification device, or some other wireless communication device, integrated therein.

SUMMARY

A system for detecting an electronic device is disclosed that has a radio which operates according to a specified standard, and which sends requests in the specified standard for answer by electronic modules which include radio reception and ability to operate with according to a defined standard. An alarm unit indicates an alarm when any of the devices respond.

The system can be a cellular telephone or other electronic device.

BRIEF DESCRIPTION OF THE DRAWINGS

These and other aspects will now be described in detail with reference to the accompanying drawing wherein.

DESCRIPTION OF THE EMBODIMENTS

The present system recognizes that wireless-devices that operate according to a standard will be incorporated into many such electronic devices. More specifically, notebook computers may eventually include Bluetooth, or other standard wireless devices that communicate information based on a request by a host.

A central radio 100 is placed on the airplane. Radio 100 operates according to a controller 101 that executes the flowchart of FIG. 2.

Figure 1:
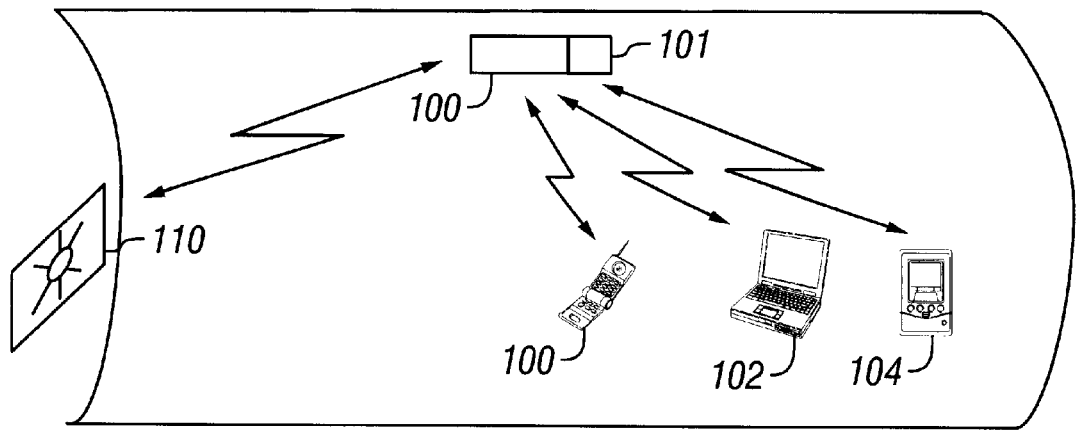
FIG. 1 shows a block diagram of the system in operation.

The Bluetooth Baseband protocol defines the physical and media access control layers of the command at 200. An Inquiry signal can be used to solicit a response from all the devices in range that are enabled to enter an Inquiry scan mode. The Inquiry signal is used by the radio 100 to solicit a response from all devices in range at 200. FIG. 1 shows laptop computers 102, PDAs 104, and cellular telephones 106 with Bluetooth equipment therein.

When devices 102, 104, 106 are within range of the radio 100, they are detected by the central radio 100 at 202. Device responses are connection is then communicated to the central alarm system 110 at 204. The central alarm system 110 can be a display device, or can be part of the airline's central computer. This alarm tells the airline crew that there is an operating radio. The crew can use this information. When received within a specified interval around take off or landing, e.g., within 15 minutes of takeoff or landing, this may cause an alarm. For example, the crew can make a global announcement that someone's computer is on.

Figure 2:
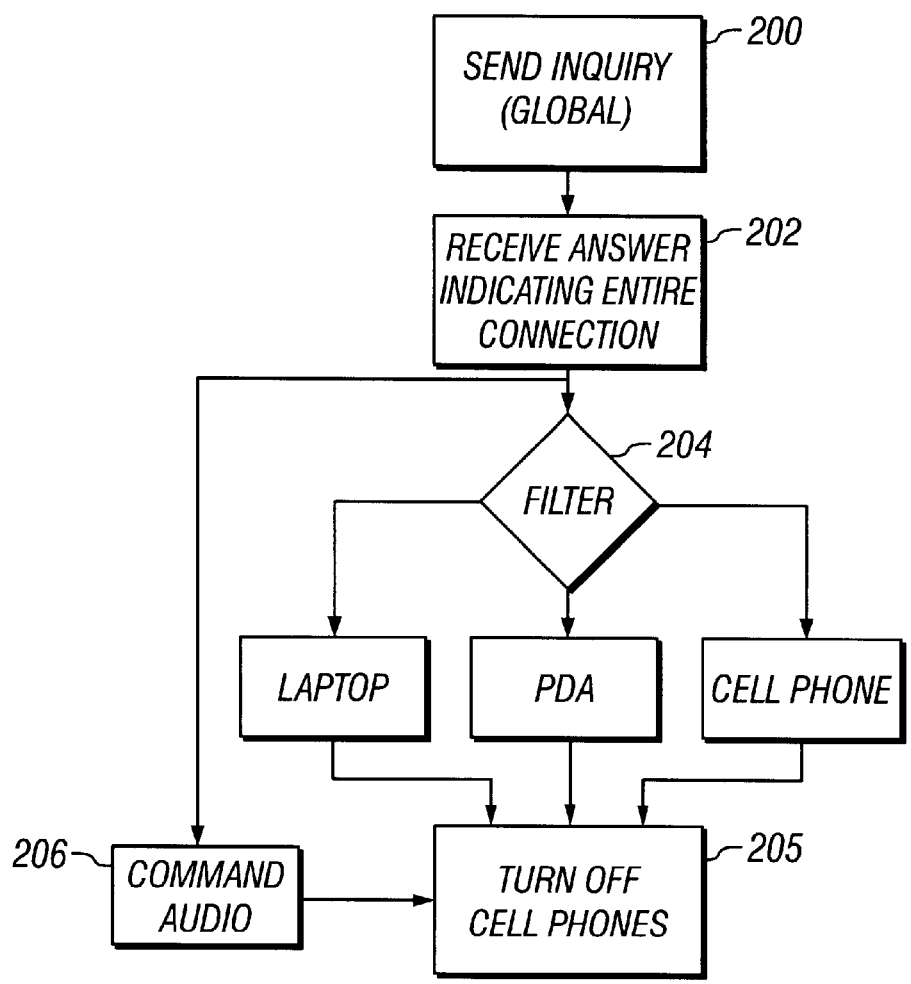
FIG. 2 shows a flowchart of operation of the system.

An alternative shown in FIG. 2 filters the signal at 204 to indicate separately whether the operating device is a laptop, PDA or cell phone.

Another alternative shown at 206 commands the operating electronic device to make a noise. For example, the computer/PDA can be commanded to "beep", or the cellular phone can be commanded to ring.

The Bluetooth Specification reserves 64 specific Inquiry addresses and defines the use for only two. The remaining addresses may be used to specify a specific class of device, where only a cellular phone would listen for a phone-specific address and respond, or used to specify a specific command, such as a shutdown request. The present system uses the software filter at 204, to select the device classes that need to be monitored on takeoff and landing.

Other wireless standards, and future versions of the Bluetooth specification, allow additional Inquiry modes, which allow an Inquire for a specific class of device. In that case, the system inquires only for certain classes of devices, rather than globally-receiving responses from all classes of devices.

Another aspect of this solution is a special address provided within Bluetooth to turn off cellular phones. This device sends out continuous Inquiry messages for the special address at 208. A cellular phone receiving this special command turns itself off, rather than sending back a response packet.

This feature could require the cellular phone to enter an Inquiry scan mode at a periodic rate to look for the special LAP address. This could lead to increased power consumption. Therefore, the cellular phones using this system would probably enter a scan mode only once every 20–60 seconds. This will reduce the power impact of the mobile device.

Because of the multiple passengers on a plane, it is preferable if the device only sends commands, rather than receiving responses. The module preferably sends a shutdown command, waits a period of time for devices to shut down, and then use a detection mode to determine who has not shut down.

Although only a few embodiments have been disclosed in detail above, other modifications are possible. For example, while Bluetooth is discussed, other wireless protocols, such as wireless LANs, e.g., IEEE Standard 802.11.

The central radio 100 can be is a Bluetooth-type transceiver that operates according to the Bluetooth specification. While it is described as being in the airline cockpit, it could also be carried by an attendant.

This feature also enables searching for multiple standards in radio 100, so that many different protocols will be accommodated, thereby enabling detecting operating features from as many devices as possible. For example, wireless LAN technology has a "magic packet" that can be used to wake up a suspended device.

Also, while the present specification describes use on airplanes, it can also be used in other locations such as movie theaters, golf and other sporting events, hospitals, museums, etc.

What is claimed is:

1. A system for detecting an electronic device, comprising:
    a radio in an airplane which operates according to a specified standard, and which sends requests in said specified standard for answer by electronic devices which include radio reception and ability to operate with said specified standard; and
    an alarm unit which indicates an alarm when any of said devices respond within a predetermined interval of take off or landing.

2. A system as in claim 1 wherein said radio is in an airplane, and said alarm unit indicates said alarm when said devices respond within a predetermined interval of take off or landing.

3. A system as in claim 1 wherein said specified standard is bluetooth.

4. A system as in claim 1 further comprising sending a command, in said specified standard, which commands one of said electronic devices to initiate a shut down process.

5. A system as in claim 4 wherein said device that initiates a shut down process is a cellular telephone.

6. A system as in claim 4 wherein said electronic device includes one of a computer, a personal digital assistant, or a cellular telephone.

7. A method of operating an airplane, comprising:
    sending a global wireless message, on the airplane, to all electronic devices that are within range of the wireless message, said global wireless message requesting all of said devices to respond;
    detecting responses from devices during a time within a specified interval of take off landing of the airplane; and
    establishing an alarm condition when said response is received within said specified interval.

8. A method as in claim 7 wherein said global wireless message is sent in a wireless communication format.

9. A method as in claim 8 wherein said wireless communication format is bluetooth format.

10. A method as in claim 7 further comprising sending a command to an electronic device requesting said electronic device to automatically turn off.

* * * * *